United States Patent
Eiteneer et al.

(10) Patent No.: US 8,728,412 B2
(45) Date of Patent: May 20, 2014

(54) APPARATUS FOR A NITROGEN PURGE SYSTEM

(75) Inventors: Boris Nickolaevich Eiteneer, Irvine, CA (US); Antonio Marquez, San Dimas, CA (US); David Kelly Moyeda, Laguna Hills, CA (US)

(73) Assignee: General Electric Company, Schenectady, NY (US)

( * ) Notice: Subject to any disclaimer, the term of this patent is extended or adjusted under 35 U.S.C. 154(b) by 678 days.

(21) Appl. No.: 12/768,362

(22) Filed: Apr. 27, 2010

(65) Prior Publication Data
US 2010/0205927 A1 Aug. 19, 2010

Related U.S. Application Data

(62) Division of application No. 11/998,377, filed on Nov. 29, 2007, now Pat. No. 7,736,608.

(51) Int. Cl.
*C01B 17/74* (2006.01)
*C01B 35/02* (2006.01)
*C01F 5/06* (2006.01)

(52) U.S. Cl.
USPC .......................... 422/528; 422/298; 422/173

(58) Field of Classification Search
None
See application file for complete search history.

(56) References Cited

U.S. PATENT DOCUMENTS

| | | |
|---|---|---|
| 3,908,371 A | 9/1975 | Nagai et al. |
| 5,441,401 A | 8/1995 | Yamaguro et al. |
| 5,517,820 A | 5/1996 | Kuroda et al. |
| 5,524,432 A | 6/1996 | Hansel |
| 5,540,047 A | 7/1996 | Dahlheim et al. |
| 5,543,124 A | 8/1996 | Yokota et al. |
| 5,715,682 A * | 2/1998 | Nakata ............................ 60/655 |
| 5,785,937 A | 7/1998 | Neufert et al. |
| 5,845,487 A | 12/1998 | Fraenkle et al. |
| 5,921,076 A | 7/1999 | Krutzsch |
| 5,988,115 A * | 11/1999 | Anderson et al. ............. 122/4 D |
| 6,001,318 A | 12/1999 | Tillaart et al. |
| 6,119,448 A | 9/2000 | Emmerling et al. |
| 6,609,365 B2 | 8/2003 | Almkvist et al. |
| 6,846,464 B2 | 1/2005 | Montreuil et al. |
| 7,188,469 B2 | 3/2007 | Bonadies et al. |
| 7,204,081 B2 | 4/2007 | Yasui et al. |
| 7,229,597 B2 | 6/2007 | Patchett et al. |
| RE39,720 E | 7/2007 | Murphy et al. |
| 7,264,785 B2 | 9/2007 | Blakeman et al. |
| 7,562,521 B2 * | 7/2009 | Shirai et al. .................... 60/286 |
| 7,722,844 B2 * | 5/2010 | Nakagawa et al. ........ 423/239.1 |

(Continued)

FOREIGN PATENT DOCUMENTS

EP 0363684 A1 4/1990

*Primary Examiner* — Melvin C Mayes
*Assistant Examiner* — Sheng H Davis
(74) *Attorney, Agent, or Firm* — Armstrong Teasdale LLP

(57) ABSTRACT

A method for reducing the emissions from combustion gases produced during a combustion process includes injecting a hydrocarbon-based reducing agent into the combustion gases to form a combustion gas mixture. The combustion gas mixture including oxides of nitrogen, $NO_x$, is directed through a selective catalyst reduction (SCR) system including a catalyst bed to remove $NO_x$ from the combustion gas mixture and to produce an exhaust gas. In one embodiment, the exhaust gases are released from the SCR to the atmosphere.

17 Claims, 2 Drawing Sheets

(56) References Cited

U.S. PATENT DOCUMENTS

| | | |
|---|---|---|
| 2002/0054844 A1 | 5/2002 | Pfeifer et al. |
| 2004/0057887 A1 | 3/2004 | Sun et al. |
| 2004/0197251 A1* | 10/2004 | Williamson ................ 423/235 |
| 2005/0069476 A1 | 3/2005 | Blakeman et al. |
| 2005/0255605 A1* | 11/2005 | Muzio et al. .................. 436/116 |
| 2006/0039843 A1 | 2/2006 | Patchett et al. |
| 2007/0231232 A1* | 10/2007 | Lin et al. ..................... 423/235 |
| 2008/0044331 A1* | 2/2008 | Schwefer et al. .......... 423/213.5 |

* cited by examiner

APPARATUS FOR A NITROGEN PURGE SYSTEM

CROSS-REFERENCE TO RELATED APPLICATIONS

This application is a divisional of U.S. patent application Ser. No. 11/998,377, filed Nov. 29, 2007, now U.S. patent No. 7,736,608, which is hereby incorporated by reference and is assigned to the assignee of the present invention.

BACKGROUND OF THE INVENTION

This invention relates generally to combustion devices and, more particularly, to emission control systems for combustion devices.

During a typical combustion process within a furnace, boiler, or combustion turbine, for example, combustion gases are produced. Known combustion gases may contain combustion products including, without limitation, carbon monoxide, water, hydrogen, nitrogen and/or mercury generated as a direct result of combusting gas, solid and/or liquid fuels. Before the combustion gases are exhausted into the atmosphere, combustion byproducts, such as particulates, mercury and oxides of nitrogen ($NO_x$), may be removed according to governmental and/or environmental requirements, standards and procedures.

At least one conventional system for removing combustion byproducts from combustion gases includes a selective catalytic reduction (SCR) system that utilizes ammonia reducing agents. However, the use of such systems may involve safety and environmental issues associated with ammonia storage, transport and delivery, formation of ammonia slip and associated secondary particulate matter, and problems associated with the formation of corrosive ammonia salts downstream of the SCR system.

BRIEF DESCRIPTION OF THE INVENTION

In one aspect, a method is provided for reducing the emissions from combustion gases produced during a combustion process. The method includes injecting a hydrocarbon-based reducing agent into the combustion gases to form a combustion gas mixture. The combustion gas mixture including oxides of nitrogen ($NO_x$) is directed through a selective catalyst reduction (SCR) system including a catalyst bed to remove $NO_x$ from the combustion gas mixture and to produce an exhaust gas.

In another aspect, a combustion chamber exhaust system is provided. The combustion chamber exhaust system includes a first transport line coupled in flow communication with a combustion chamber that contains combustion gases including oxides of nitrogen ($NO_x$) produced during a combustion process. The first transport line is configured to extract a portion of combustion gases for use as an exhaust gas. A vaporizer chamber is coupled in flow communication with the first transport line. The vaporizer chamber is configured to receive the exhaust gas and a supply of liquid reducing agent, vaporize the liquid reducing agent, and form a mixture of the vaporized reducing agent and the exhaust gas. A second transport line is coupled in flow communication with the vaporizer chamber. The second transport line is configured to channel the mixture to an agent injection grid (AIG) positioned upstream from a selective catalyst reduction (SCR) system in flow communication with the combustion chamber. The SCR system includes a catalytic bed configured to facilitate reducing $NO_x$ within the combustion gases.

In another aspect, a system for reducing the emissions from combustion gases produced during a combustion process is provided. The system includes a duct configured to receive the combustion gases. At least one injector is configured to inject a hydrocarbon-based reducing agent into the combustion gases. A selective catalyst reduction (SCR) system is positioned downstream from the at least one injector and includes a catalytic bed configured to facilitate a reduction reaction of $NO_x$ within the combustion gases.

DETAILED DESCRIPTION OF THE INVENTION

The present invention provides a method and system for continuously removing and reducing compounds including oxides of nitrogen ($NO_x$) from a flow of combustion gases produced during a combustion process within a furnace, boiler or combustion turbine. The combustion gases are produced as a direct result of combusting gaseous, solid and/or liquid fuels and may include, without limitation, $NO_x$, carbon monoxide, carbon dioxide, water, hydrogen, and nitrogen. Before the combustion gases are exhausted into the atmosphere, combustion products, such as oxides of nitrogen ($NO_x$), are removed according to governmental and/or environmental requirements, standards and procedures.

Methods are described below in reference to applications in connection with, and operation of, a system for reducing emissions of oxides of nitrogen ($NO_x$) from a supply of combustion gas generated during a combustion process, such as from combustion gas generated during operation of a fossil-fuel combustion source. In one embodiment, the method includes a selective catalytic reduction of oxides of nitrogen ($NO_x$) utilizing a hydrocarbon-based reducing agent. In one exemplary embodiment, the reducing agent is conditioned, transported, and injected into the exhaust gases that contain the oxides of nitrogen ($NO_x$) from a combustion source. It should be apparent to those skilled in the art and guided by the teachings herein provided that the method and system described herein are likewise applicable to any combustion device including, without limitation, boilers and heaters, and may be applied to systems consuming fuel, coal, oil or any solid, liquid or gaseous fuel.

Figure 1:
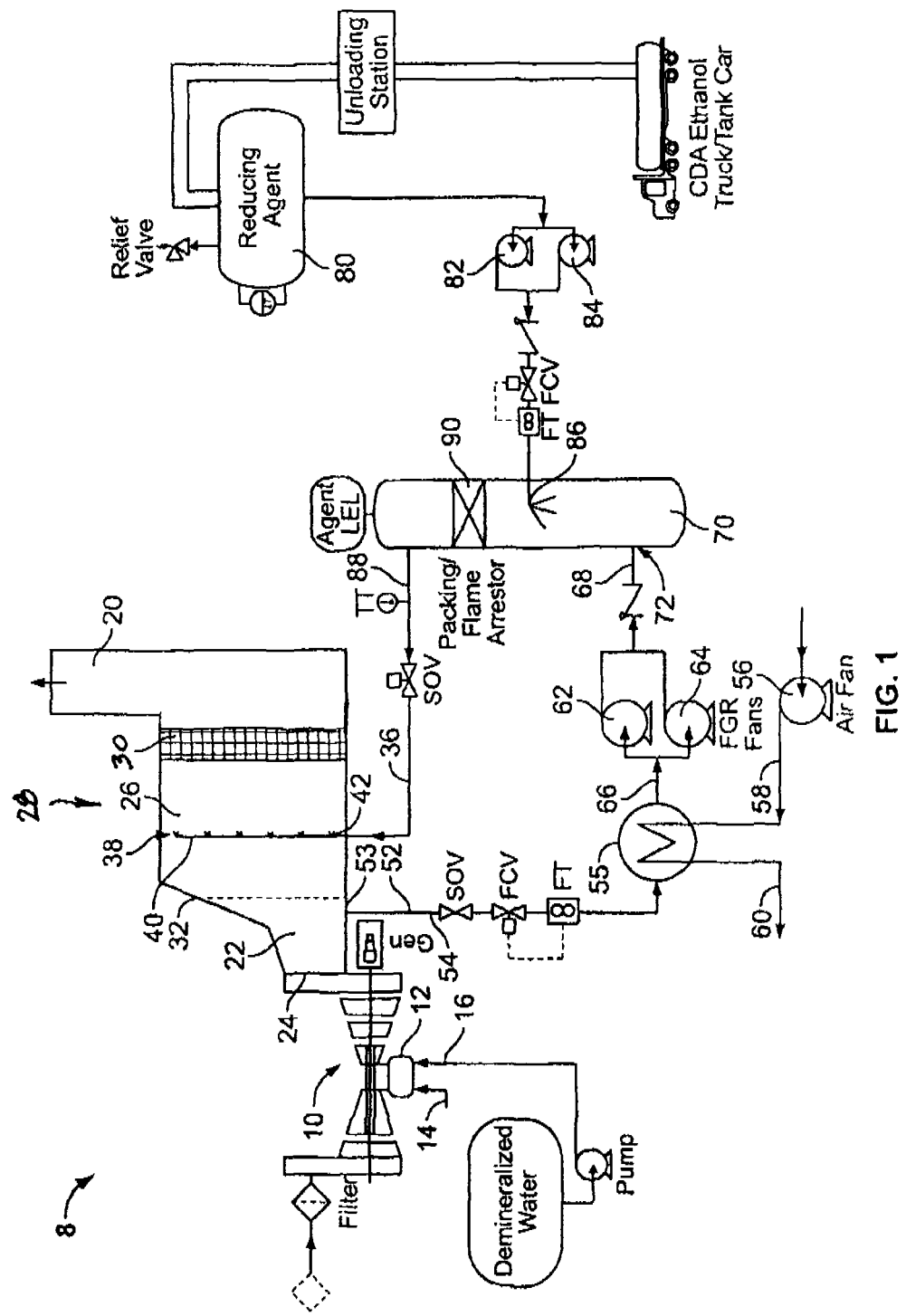
FIG. 1 is a schematic view of an exemplary power plant system.

FIG. 1 schematically illustrates an exemplary combustion turbine system 8 including a selective catalytic reduction (SCR) system that facilitates the removal or reduction of oxides of nitrogen ($NO_x$) from combustion gases generated during a combustion process, such as from combustion gases generated during operation of a fossil-fuel combustion source. In one embodiment, the combustion source includes a natural gas-fired aeroderivative combustion turbine 10 commercially available from the General Electric Company. Combustion turbine 10 defines a combustion chamber 12 within which a fuel 14, such as natural gas, is mixed with an oxidizer 16, such as air, and combusted. In one embodiment, air is supplied to combustion chamber 12 in excess of a stoichiometric amount such that the combustion gases exiting combustion chamber 12 include unreacted oxygen in an amount of about 10% to about 15% by volume. Oxides of nitrogen ($NO_x$) are formed as a byproduct of the combustion process. Initial concentration levels of $NO_x$ within a flow of combustion gases exiting the combustion chamber of a conventional gas combustion turbine are quite low, and may be on the order of about 9 parts per million by volume (ppmv) to about 200 ppmv. In one embodiment, water is injected into combustion chamber 12 to facilitate suppressing $NO_x$ formation in combustion chamber 12. A typical concentration of $NO_x$ in the combustion gases for a water-injected gas turbine is about 25 ppmv. $NO_x$-containing combustion gases formed during the combustion process are channeled to an exhaust stack 20 and released to atmosphere.

The combustion gases are passed through a selective catalyst reduction (SCR) system 28 including a catalyst bed 30 to remove $NO_x$ before being released to the atmosphere as exhaust gases. As applied to stationary power plant pollutant control applications, in one embodiment catalyst bed 30 includes one or more layers of a catalyst monolith (not shown). The catalyst monolith may be homogeneous or washcoated, and may include ceramic substrates or metal substrates. A cross-sectional area and/or a depth of catalyst bed 30, as well as a geometry of each catalyst monolith, are optimized to achieve several performance goals including, without limitation, a high $NO_x$ removal efficiency, a low pressure drop through catalyst bed 30 and/or a minimal formation of byproducts. In one embodiment, a linear velocity of the combustion gases flowing through catalyst bed 30 is reduced to provide sufficient residence time for the reactions of selective catalytic reduction to take place. Lowering the gas velocity in catalyst bed 30 further facilitates reducing a pressure drop across catalyst bed 30. With catalyst bed 30 having a sufficiently large cross-sectional area, the combustion gas velocity through catalyst bed 30 is reduced to a desired velocity.

A transition duct or diffuser section 22, coupled in flow communication with exhaust flange 24, channels and distributes the combustion gases into a large-area duct 26 housing catalyst bed 30. A substantially even flow distribution of the combustion gases over a surface area of catalyst bed 30 facilitates achieving high $NO_x$ removal efficiencies. In one embodiment, additional flow conditioning elements are used within diffuser section 22 and/or duct 26 to facilitate forming a substantially even flow distribution of the combustion gas flow over catalyst bed 30. In the exemplary embodiment, a perforated plate 32 is positioned within diffuser section 22 or duct 26. Perforated plate 32 includes a plurality of openings 34 defined herein, through which the combustion gases flow. The combustion gas flows through openings 34 to form a substantially even flow distribution of the combustion gases. In one embodiment, one or more turning vane or any suitable component known in the art, such as one or more static mixer, is used to facilitate achieving a substantially even flow distribution of the combustion gases over catalyst bed 30.

In one embodiment, a mixture of hydrocarbon-based reducing agent and carrier gas, collectively referred to as 36, is injected into the combustion gases upstream from catalyst bed 30. Oxides of nitrogen ($NO_x$) react with the reducing agent on a surface of catalyst bed 30 in the presence of oxygen, producing elemental nitrogen ($N_2$), water ($H_2O$), and carbon dioxide ($CO_2$). To facilitate effective catalytic reactions to remove or reduce $NO_x$, the reducing agent is thoroughly and homogeneously mixed with gaseous $NO_x$ before reaching the surface of catalyst bed 30. To facilitate a quicker and more efficient mixing with the combustion gases over a cross-sectional area of catalyst bed 30, the reducing agent is introduced into duct 26 through an array of injectors 38 configured as an agent injection grid (AIG) 40.

In one embodiment, the hydrocarbon-based reducing agent is present in the combustion gases at concentrations comparable to concentrations of $NO_x$. That is, in the exemplary embodiment, the reducing agent is in the range of tens to hundreds of parts-per-million by volume (ppmv) for efficient $NO_x$ removal to occur on the SCR catalyst, as well as to minimize reducing agent consumption and to avoid byproduct formation. In one embodiment, the reducing agent is introduced through an ordered array of injectors, such as AIG 40, to facilitate quick and efficient mixing of the hydrocarbon-based reducing agent with a relatively larger volume of exhaust gas. Mixing characteristics may be improved by increasing the mass-momentum of the injected flow, leading to formation of turbulent flow. The mass-momentum of hydrocarbon-based reducing agent can be increased if another component, such as a transport media or carrier, is added to the reducing agent upstream of the injectors. In one embodiment, a carrier that is relatively inert with respect to the catalyst, such as air, steam, recirculated exhaust gas, and other suitable inert gases, is added to the reducing agent. The choice of carrier may be dictated by carrier availability, type of reducing agent, and operating cost considerations.

Using a hydrocarbon-based reducing agent presents additional complexity if the temperature of the combustion gases to be treated is near, or above, the auto-ignition temperature of the reducing agent. At such temperatures, the reducing agent reacts with oxygen present in the combustion gases and, given enough time, may be completely combusted before reaching the catalyst. The degree to which the reducing agent is consumed in the reaction with oxygen primarily depends, among other parameters, upon gas temperature, initial agent concentration, oxygen concentration (typically in a range of about 0.5% to about 20% by volume for combustion gas), and reducing agent residence time. The reducing agent residence time in the gas phase is defined as a time between injection of the reducing agent into the combustion gases and the reaction of the reducing agent on the catalyst surface.

Depletion of the reducing agent is aggravated if gas recirculation zones form downstream from the reducing agent injection points. Such gas recirculation zones increase local reducing agent residence times, reduce agent-oxygen contact, and may cause the formation of local hot spots wherein the reducing agent is combusted, rather than being used to facilitate $NO_x$ removal. To avoid reducing agent depletion upstream from the catalyst, the combustion gas temperature and/or the reducing agent residence times are lowered. In a particular embodiment, the combustion gas temperature is decreased by mixing the combustion gases with a cold gas, such as tempering air, or by extracting heat using a heat exchanger. Due to a high volumetric flow rate of turbine combustion gases, these methods require installation of additional hardware, such as fans, pumps, and flow control equipment, and are generally costly to implement. A method capable of minimizing reducing agent oxidation upstream of the SCR catalyst by using fast mixing techniques to reduce reducing agent residence time is more advantageous than reducing the temperature of the combustion gases.

In one embodiment, the hydrocarbon-based reducing agent includes, without limitation, saturated hydrocarbons, unsaturated hydrocarbons, alcohols, and/or ketones, or mixtures thereof. In alternative embodiments, other suitable reducing agents may be used. Compared with conventional SCR systems which use ammonia as a reducing agent, the SCR system of the present invention offers several key advantages including the elimination of the safety and environmental issues associated with ammonia storage, transport, and delivery, the elimination of ammonia slip and associated secondary particulate matter formation, and the elimination of problems related to formation of corrosive ammonia salts downstream of the conventional SCR systems.

In one exemplary embodiment, the reducing agent is thoroughly and homogeneously mixed with gaseous $NO_x$ before reaching the catalyst surface for catalytic reactions of $NO_x$ removal to proceed effectively. With recirculated combustion gas as the carrier, fast and efficient mixing of the reducing agent with the exhaust stream is facilitated. A heat capacity of the hot recirculated gas carrier vaporizes the liquid reducing agent before the reducing agent is injected into the exhaust stream flow. Carrier pressure, temperature, and flow rate, along with injector geometry, design and materials of construction are all optimized to facilitate minimizing reducing agent depletion before the reducing agent reaches the catalyst face. Combustion exhaust gases contain oxygen, typically in the range of about 0.5% to about 20% by volume, which can potentially react with the hydrocarbon-based reducing agent. Thus, provisions to facilitate eliminating or minimizing reducing agent combustion or explosion during reducing agent storage, vaporization, transport and/or injection are implemented within the system in one embodiment.

In one embodiment, AIG 40 includes one or more lances 42 that protrude inwardly from an inner wall surface 43 of duct 26. In alternative embodiments, injectors 38 may include nozzles, perforated pipes, and/or other suitable components depending upon a desired application.

Figure 2:
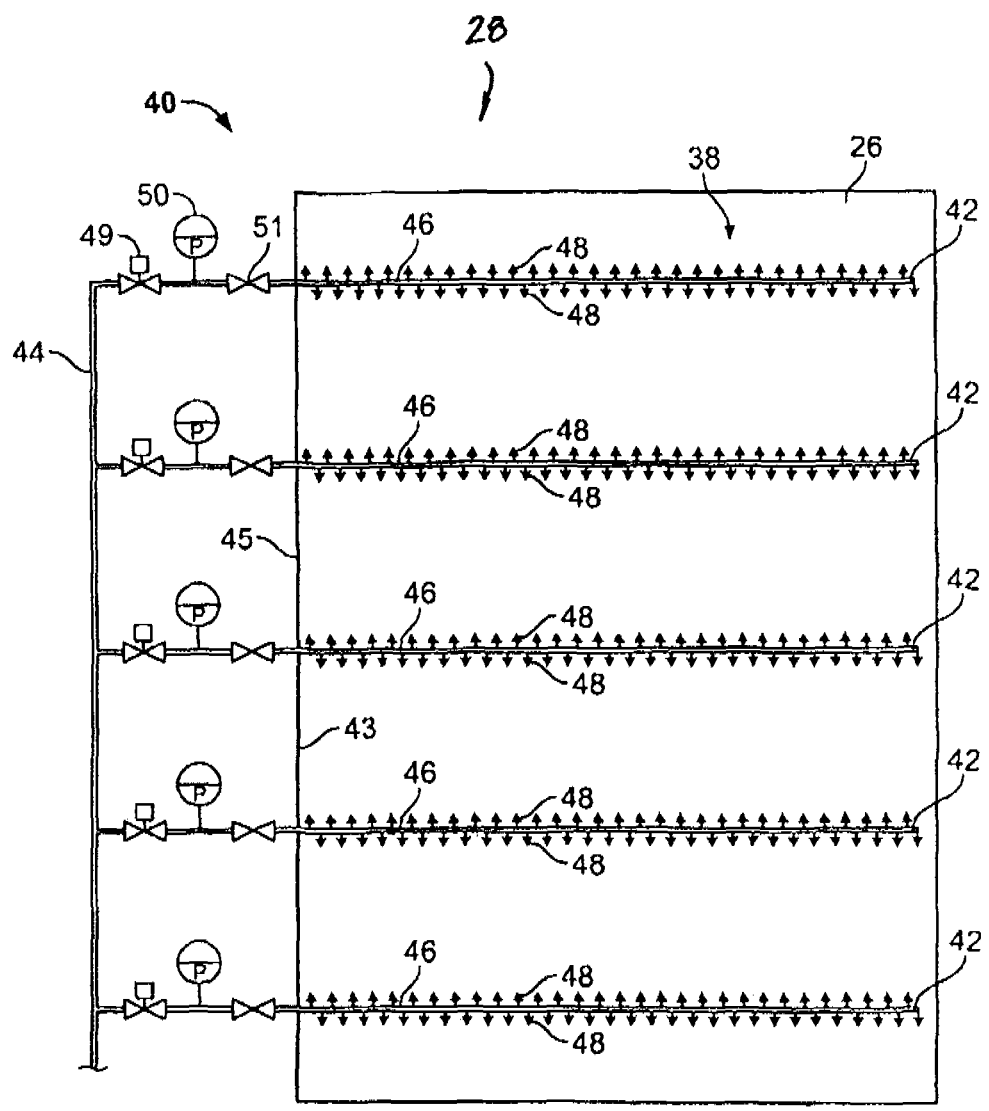
FIG. 2 is a schematic view of an exemplary agent injection grid (AIG) suitable for use in the power plant system shown in FIG. 1.

FIG. 2 schematically illustrates an exemplary agent injection grid (AIG) 40 including a set or array of lances 42. Each lance 42 extends inwardly from an inner wall surface 43 of duct 26. Lances 42 are connected to a header 44 coupled to an outer wall surface 45 of duct 26. In one embodiment, each lance 42 includes a pipe 46 that defines or includes one or more nozzles 48 oriented at an angle, such as a perpendicular angle, to the combustion gas flow. It should be apparent to those skilled in the art and guided by the teachings herein provided that a distance between adjacent lances, an opening size or diameter of each nozzle, arrangement of the nozzles, and/or a flow rate of the reducing agent-carrier mixture through each lance facilitates achieving a desired reducing agent distribution at an upstream face or front surface of catalyst bed 30. In one embodiment, the reducing agent-carrier mixture flow through each lance 42 is controlled individually by one or more flow control elements known in the art. As shown in FIG. 2, each lance 42 includes a mass flow controller 49, a pressure indicator 50 and/or a shutoff valve 51 that facilitate controlling the reducing agent-carrier mixture flow through lance 42.

In one embodiment, extracted combustion gases, such as recirculated flue gases, are used as a carrier for the reducing agent. Flue gas recirculation (FGR) offers several significant advantages over other transport media including: (a) a small portion of the total flow of combustion gases is readily extracted from various locations in the exhaust ductwork with only a small penalty in overall plant efficiency; (b) heat content of the hot combustion gases is utilized to facilitate vaporization of the liquid reducing agent; and (c) an oxygen concentration in the combustion gases is lower than an oxygen concentration in air, thereby reducing premature hydrocarbon reducing agent oxidation within transport lines, as described in greater detail below.

In one embodiment, a small portion of the combustion gases, or extracted combustion gases 52, such as about 0.1% by volume to about 5% by volume or, more specifically, about 0.25% by volume to about 2% by volume or, even more specifically, about 0.5% by volume to about 1% by volume, is extracted through a suitable opening or duct formed in and providing communication with a cavity defined by duct 26. In the exemplary embodiment, a port 53 is operatively coupled to or defined within duct 26 upstream from AIG 40 to provide flow communication between the duct cavity and a transport line 54. A heat exchanger 55 is operatively coupled to transport line 54 to facilitate decreasing a temperature of extracted combustion gas 52 and to facilitate minimizing reducing agent oxidation within the vaporization system and corresponding transport lines. In one embodiment, heat exchanger 55 includes a counterflow gas-to-gas heat exchanger. In alternative embodiments, any suitable heat exchanger known in the art and guided by the teachings herein provided may be used. Referring further to FIG. 1 in the exemplary embodiment, a forced-draft air fan 56 supplies an ambient air stream 58 to a cold side of heat exchanger 55 and heated air 60 is discarded to the atmosphere.

Two redundant FGR fans 62 and 64 extract a portion 66 of extracted combustion gases 52 as carrier gas. FGR fans 62 and 64 are downstream from heat exchanger 55 and are operated at a relatively lower temperature to decrease power requirements and to alleviate or reduce material concerns. In one embodiment, carrier gas 68 having a lower temperature and a higher pressure than a temperature and pressure of extracted combustion gases 52 is directed into a first or bottom portion of a vaporizer chamber 70. In the exemplary embodiment, the carrier exhaust gas temperature at an inlet 72 to vaporizer chamber 70 is maintained sufficiently low to facilitate minimizing oxidation of the hydrocarbon reducing agent in the vaporizer system and transport lines. Such oxidation may result in undesirable reducing agent depletion and/or possible coke formation inside the transport lines. On the other hand, the carrier gas temperature is sufficiently high to facilitate rapidly and completely vaporizing the hydrocarbon reducing agent and prevent subsequent reducing agent condensation in the transport system. One well-known long-term effect of condensation may be accelerated corrosion of transport system components. Therefore, in one embodiment, the carrier gas temperature is maintained between about 230° F. and about 600° F. or, more specifically, between about 250° F. and about 400° F. to facilitate preventing or limiting corrosion within the transport system components.

A reducing agent, such as a hydrocarbon-based reducing agent, is stored within a storage tank 80. Storage tank 80 has a suitable capacity to provide an uninterrupted reducing agent supply sufficient for a desired level of $NO_x$ reduction according to a gas turbine operation regime and/or a reducing agent shipment schedule. In one embodiment, the storage tank capacity allows substantially continuous operation of the SCR system for a suitable time period, such as for at least one week, between storage tank refills. In one embodiment, two redundant pumps 82 and 84 supply a suitable liquid hydrocarbon reducing agent to vaporizer chamber 70. The liquid reducing agent is injected through a sparger 86 into vaporizer chamber 70, such as at a second or top portion of vaporizer chamber 70. Reducing agent droplets fall towards the bottom portion of vaporizer chamber 70, while hot carrier gases 68 flow in an opposing direction from the bottom portion of vaporizer chamber 70. Vaporizer chamber geometry, carrier gas flowrate and/or temperature, as well as sparger characteristics are chosen to facilitate complete and efficient vaporization of the reducing agent droplets while avoiding pooling of the non-vaporized reducing agent at the bottom portion of vaporizer chamber 70.

Mixture 36 of vaporized hydrocarbon reducing agent and carrier gas flows from vaporizer chamber 70 through a transport line 88 into AIG 40. To enhance explosion and/or fire protection, a flame arrestor 90 is positioned within vaporizer chamber 70. In one embodiment, flame arrestor 90 includes a ceramic or glass packing material, such as beads, Rashig rings, and/or any suitable material known to those skilled in the art and guided by the teachings herein provided. In addition to explosion and/or fire protection, the packing material also facilitates efficiently mixing the reducing agent vapor and the carrier gas due to a large number of tortuous passages through which the reducing agent/carrier gas mixture is required to flow.

In one embodiment, a number of safety shutoff valves, interlocks, check and relief valves, and other hardware components, as well as flow, temperature, and pressure measurement and control equipment, software, and algorithms to measure and control reducing agent supply and process parameters are provided in accordance with required $NO_x$ control efficiency and gas turbine operating parameters.

In one embodiment, the emissions from combustion gases produced during a combustion process are reduced by injecting a hydrocarbon-based reducing agent including, without limitation, at least one of a saturated hydrocarbon, an unsaturated hydrocarbon, an alcohol, and a ketone, into the combustion gases to form a combustion gas mixture. In a particular embodiment, the reducing agent is injected into the combustion gases before the combustion gases contact the catalytic bed. In this embodiment, the reducing agent is mixed with a carrier prior to injecting the hydrocarbon-based reducing agent into the combustion gases. The combustion gas mixture including oxides of nitrogen ($NO_x$) is directed through a selective catalyst reduction (SCR) system including a catalyst bed to remove $NO_x$ from the combustion gas mixture and to produce an exhaust gas. The reducing agent may be injected through an array of injectors configured as an agent injection grid (AIG) before directing the combustion gas mixture through the SCR system. In one embodiment, the exhaust gas is released from the outlet of the SCR system to the atmosphere.

In one embodiment, a portion of the combustion gases is utilized as the carrier to vaporize the reducing agent before the reducing agent is injected into the combustion gases. The portion of the combustion gases is extracted and directed into a vaporizer chamber. A carrier exhaust gas having a lower temperature and a higher pressure than a temperature and a pressure of the extracted combustion gases is also directed into the vaporizer chamber. A liquid hydrocarbon-based reducing agent is supplied into the vaporizer chamber and the liquid reducing agent is vaporized when droplets of the vaporized reducing agent mix with the carrier exhaust gas. The mixture of the vaporized reducing agent and the carrier exhaust gas is then introduced into the combustion gases to form the combustion gas mixture.

The above-described method and system facilitates the continuous removal of oxides of nitrogen ($NO_x$) from a supply of combustion gas in a cost-effective and reliable manner. More specifically, the method and system condition, transport and inject a reducing agent, such as in a mixture of reducing agent and a carrier, into the $NO_x$-containing combustion gas of a combustion source. In one embodiment, the mixture includes a hydrocarbon-based reducing agent, such as saturated or unsaturated hydrocarbons, alcohols, ketones, or mixtures thereof, and recirculated combustion gas.

Exemplary embodiments of a method and system for continuously removing oxides of nitrogen ($NO_x$) from a supply of combustion gas are described above in detail. The method and system are not limited to the specific embodiments described herein, but rather, steps of the method and/or components of the system may be utilized independently and separately from other steps and/or components described herein. Further, the described method steps and/or system components can also be defined in, or used in combination with, other methods and/or systems, and are not limited to practice with only the method and system described herein.

While the invention has been described in terms of various specific embodiments, those skilled in the art will recognize that the invention can be practiced with modification within the spirit and scope of the claims.

What is claimed is:

1. A combustion chamber exhaust system comprising:
    a combustion gas exhaust duct coupled in flow communication with a combustion chamber;
    a first transport line coupled in flow communication with said combustion exhaust duct that contains a supply of combustion gases including oxides of nitrogen ($NO_x$) produced during a combustion process, said first transport line configured to extract a portion of the combustion gases from said combustion gas exhaust duct for use as an exhaust gas;
    a heat exchanger coupled to said first transport line downstream of said combustion gas exhaust duct, said heat exchanger facilitates decreasing a temperature of the extracted exhaust gases;
    at least one recirculation fan coupled downstream from said heat exchanger, said at least one recirculation fan configured to extract a portion of the extracted exhaust gas from said heat exchanger for use as a carrier gas, the carrier gas having a lower temperature and a higher pressure than a temperature and a pressure of the extracted exhaust gas;
    a vaporizer chamber coupled downstream from said at least one recirculation fan, said vaporizer chamber configured to:
        receive the carrier gas from said at least one recirculation fan and a supply of liquid hydrocarbon-based reducing agent;
        vaporize the liquid hydrocarbon-based reducing agent; and
        form a mixture of the vaporized liquid hydrocarbon-based reducing agent with the carrier gas;
    a flame arrestor positioned within said vaporizer chamber, said flame arrestor including a plurality of packing beads configured to prevent combustion of the mixture and to efficiently mix the vaporized liquid hydrocarbon-based reducing agent and the carrier gas; and
    a second transport line coupled in flow communication with said vaporizer chamber, said second transport line configured to channel the mixture to an agent injection grid (AIG) positioned upstream from a selective catalyst reduction (SCR) system, wherein said heat exchanger is configured to indirectly cool the extracted exhaust gases to facilitate preventing combustion of the mixture downstream from said AIG, said SCR comprising a catalytic bed configured to facilitate reducing $NO_x$ within the combustion gases.

2. A combustion chamber exhaust system in accordance with claim 1 wherein said AIG further comprises at least one injector configured to inject the mixture upstream from said SCR system.

3. A combustion chamber exhaust system in accordance with claim 1 wherein said AIG further comprises at least one lance extending inwardly from an inner wall of said combustion gas exhaust duct, said at least one lance configured to distribute the mixture across said catalyst bed.

4. A combustion chamber exhaust system in accordance with claim 1 wherein said AIG further comprises an array of lances, each of said lances extends inwardly from an inner wall surface of said combustion gas exhaust duct.

5. A combustion chamber exhaust system in accordance with claim 4 wherein each said lance is coupled to a header positioned on an outer wall surface of said combustion gas exhaust duct.

6. A combustion chamber exhaust system in accordance with claim 4 wherein each said lance further comprises a pipe defining at least one nozzle oriented at an angle relative to the combustion gas flow.

7. A combustion chamber exhaust system in accordance with claim 6 wherein said at least one nozzle is oriented substantially perpendicular to the combustion gas flow.

8. A combustion chamber exhaust system in accordance with claim 1 further comprising a perforated plate coupled within said combustion gas exhaust duct upstream of said AIG.

9. A turbine comprising:
- a combustion chamber sized to contain a supply of combustion gases, including oxides of nitrogen (NOx) produced during operation of said turbine;
- a combustion gas exhaust duct coupled in flow communication with said combustion chamber;
- a heat exchanger coupled downstream from said combustion gas exhaust duct, said heat exchanger configured to receive a portion of combustion gases extracted from said combustion gas exhaust duct for use as an exhaust gas, said heat exchanger facilitates decreasing a temperature of the extracted exhaust gases;
- at least one recirculation fan coupled downstream from said heat exchanger, said at least one recirculation fan configured to extract a portion of the extracted exhaust gas from said heat exchanger for use as a carrier gas, the carrier gas having a lower temperature and a higher pressure than a temperature and a pressure of the extracted exhaust gas;
- a vaporizer chamber coupled in flow communication with said at least one recirculation fan, said vaporizer chamber configured to receive the carrier gas from said at least one recirculation fan and a supply of liquid hydrocarbon-based reducing agent, said vaporizer chamber further configured to vaporize the liquid hydrocarbon-based reducing agent and mix the carrier gases with the vaporized liquid hydrocarbon-based reducing agent to form a mixture of the liquid hydrocarbon-based reducing agent and the carrier gas;
- a flame arrestor positioned within said vaporizer chamber, said flame arrestor including a plurality of packing beads configured to prevent combustion of the mixture and to efficiently mix the vaporized liquid hydrocarbon-based reducing agent and the carrier gas; and
- a selective catalyst reduction (SCR) system coupled in flow communication with and downstream from said vaporizer chamber, said vaporizer chamber further configured to discharge the mixture of the reducing agent and the carrier gas to an agent injection grid (AIG) coupled upstream from said SCR system, wherein said heat exchanger is configured to indirectly cool the extracted combustion gases to facilitate preventing combustion of the mixture downstream from said AIG, said SCR system comprises a catalytic bed configured to facilitate reducing NOx within the combustion gases.

10. The turbine in accordance with claim 9 wherein said AIG further comprises at least one injector configured to inject the mixture upstream from said SCR system.

11. The turbine in accordance with claim 9 wherein said AIG further comprises extending at least one lance inwardly from an inner wall of a duct in flow communication with said combustion gas exhaust duct.

12. The turbine in accordance with claim 11 wherein said at least one lance is configured to distribute the mixture across said catalytic bed.

13. The turbine in accordance with claim 12 wherein said AIG further comprises an array of lances, each of said lances extend inwardly from an inner wall surface of a said combustion gas exhaust duct.

14. The turbine in accordance with claim 13 wherein each said lance is coupled to a header positioned on an outer wall surface of said gas exhaust duct.

15. The turbine in accordance with claim 14 wherein each said lance further comprises a pipe defining at least one nozzle oriented at an angle relative to the combustion gas flow.

16. The turbine in accordance with claim 15 wherein said at least one nozzle is oriented substantially perpendicular to the combustion gas flow.

17. The turbine in accordance with claim 9 further comprising a perforated plate coupled within said combustion gas exhaust duct upstream of said AIG.

* * * * *